(12) United States Patent
Blake

(10) Patent No.: US 6,491,261 B1
(45) Date of Patent: Dec. 10, 2002

(54) WING MOUNTED AIRCRAFT YAW CONTROL DEVICE

(75) Inventor: William Blake, Xenia, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/550,967

(22) Filed: Apr. 17, 2000

(51) Int. Cl.[7] .................................................. B64C 9/12
(52) U.S. Cl. ....................... 244/213; 244/75 R; 244/113
(58) Field of Search .............................. 244/75 R, 184, 244/213, 215, 217, 90 A, 110 A, 113, 110 D

(56) References Cited

U.S. PATENT DOCUMENTS

| | | | |
|---|---|---|---|
| 4,566,657 A | * | 1/1986 | Grow ........................ 244/90 A |
| 5,564,652 A | | 10/1996 | Trimbath |
| 5,895,015 A | * | 4/1999 | Saiz ............................ 244/215 |

OTHER PUBLICATIONS

NACA Research Memorandum Investigation Of Spoiler––Slot–Deflector Ailerons And Other Spoiler Ailerons On A 45° Sweptback–Wing–Fuselage Combination At Mach Numbers From 0.60 to 1.03 West et al., Sep. 11, 1956.

* cited by examiner

*Primary Examiner*—Peter M. Poon
*Assistant Examiner*—Timothy D Collins
(74) *Attorney, Agent, or Firm*—Richard A. Lambert; Bobby D. Scearce; Thomas L. Kundert

(57) ABSTRACT

A wing mounted yaw control device is disclosed. The wing mounted yaw control device includes a spoiler hingedly mounted on a first wing surface and a deflector hingedly mounted on a second wing surface. A deployment mechanism is provided to effect simultaneous deployment of the spoiler and deflector. During operation, the spoiler and deflector are selectively deployed in order to impart an unbalanced drag force on one wing, thereby imparting the desired yaw moment to an aircraft in flight.

4 Claims, 3 Drawing Sheets

WING MOUNTED AIRCRAFT YAW CONTROL DEVICE

RIGHTS OF THE GOVERNMENT

This invention was made in the performance of a Cooperative Research and Development Agreement with the Department of the Air Force. The Government of the United States has certain rights to use the invention.

BACKGROUND OF THE INVENTION

The present invention relates generally to aircraft control systems, and more specifically, to a wing mounted aircraft yaw control device for imparting yaw moment to tailless aircraft.

The advantages of all-wing, tailless aircraft are known. For example, tailless aircraft provide enhanced stealthy operating characteristics due to their inherent low-observable configuration. Moreover, all-wing aircraft provide other benefits such as improved efficiency due to reduced weight and drag and, accordingly, are well suited for use in a wide variety of applications such as in remotely controlled aircraft. An example of a successful all-wing tailless aircraft in use today is the B-2 Spirit aircraft employed by the U. S. Air Force.

A significant disadvantage of the tailless aircraft configuration lies in the attendant loss of the aircraft rudder normally incorporated within the vertical tail section. The rudder is provided in conventional aircraft to provide side to side or yaw moment to the aircraft in flight. Therefore, with the loss of the rudder, other means must be provided to impart yaw moment to the tailless aircraft.

The B-2 Spirit aircraft cited above overcomes the loss of the rudder by the incorporation of what is known as a split aileron at the trailing edge of the wing. The split aileron operates in "clamshell" fashion, opening when necessary to provide increased drag and hence impart yaw motion to the aircraft. While this technique works quite well and overcomes the loss of the rudder on the aircraft, it has inherent limitations associated with it. For example, the operating moment forces imparted on the split aileron actuator during operation are quite large. This necessitates the application of large forces and a concurrent expenditure of large amounts of energy in order to effect the desired yaw moment during flight. The control mechanism must be similarly large, disadvantageously adding to aircraft weight.

Another limitation inherent in this design is that there exists a "deadband" of actuation wherein the ailerons must be deployed a minimum amount before any yaw motion takes place. This is due, in part, to the placement of the ailerons on the trailing edge of the wing. As a result, the ailerons are often maintained in a partially extended position in order to reduce the deadband effect. This has the disadvantage of increasing drag as well as forces exerted on the aileron extension mechanism.

A need exists for an improved wing mounted yaw control device for tailless jod aircraft. Such a device would provide improved yaw control characteristics while requiring low actuation forces and minimize aircraft drag in order to impart the desired yaw moment to an aircraft in flight.

SUMMARY OF THE INVENTION

It is therefore a primary object of the present invention to provide a wing mounted yaw control device overcoming the limitations and disadvantages of the prior art.

It is another object of the present invention to provide a wing mounted yaw control device that provides effective yaw moment to a tailless aircraft in flight.

It is yet another object of the present invention to provide a wing mounted yaw control device requiring relatively low actuation forces during operation.

These and other objects of the invention will become apparent as the description of the representative embodiments proceeds.

In accordance with the foregoing principles and objects of the present invention, a wing mounted yaw control device is provided to impart yaw motion to an aircraft in flight. The wing mounted yaw control device of the present invention has particular utility on tailless aircraft in order to compensate for the loss of the vertical rudder found on conventional aircraft.

The wing mounted yaw control device of the present invention includes a deployable spoiler hingedly mounted on the upper surface of the aircraft wing. A deployable deflector is hingedly mounted on the lower surface of the aircraft wing. A deployment mechanism is mounted within the wing and is provided to effect the simultaneous deployment of the spoiler and deflector. The spoiler and deflector, when deployed, impart a net drag force to the wing. This, in turn, causes a yaw moment to be imparted to the aircraft due to the unbalanced drag force on the one wing, causing the aircraft to move in the yaw direction. The degree to which the spoiler and deflector are deployed corresponds with the degree of yaw moment imparted to the aircraft. Thus, gradual turns can be readily effected by selective partial deployment of the spoiler and deflector. Moreover, it can be appreciated that the wing mounted yaw control device of the present invention can also provide an effective speed brake when deployed on both wings simultaneously.

Advantageously, the operative combination of the spoiler and deflector requires very low actuator force during operation. This is because the spoiler tends to direct the airflow away from the wing while the deflector tends to direct the airflow into the wing. The net effect is to achieve a balance between the closing force imparted to the deployment mechanism by the spoiler and the opening force imparted to the deployment mechanism by the deflector. In this way, a low or even zero net torsional moment is created. Moreover, it should be appreciated that this force balancing effect is found throughout the operating range of the wing mounted yaw control device of the present invention. This has the dual advantage of providing ease of operation while simultaneously reducing the size and energy requirement of the deployment mechanism.

As can be seen, the wing mounted yaw control device of the present invention imparts the desired yaw moment to an aircraft in flight while requiring the input of low actuation forces. The wing mounted yaw control device provides effective aircraft yaw moment throughout the range of aircraft operation while requiring very low actuation force.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
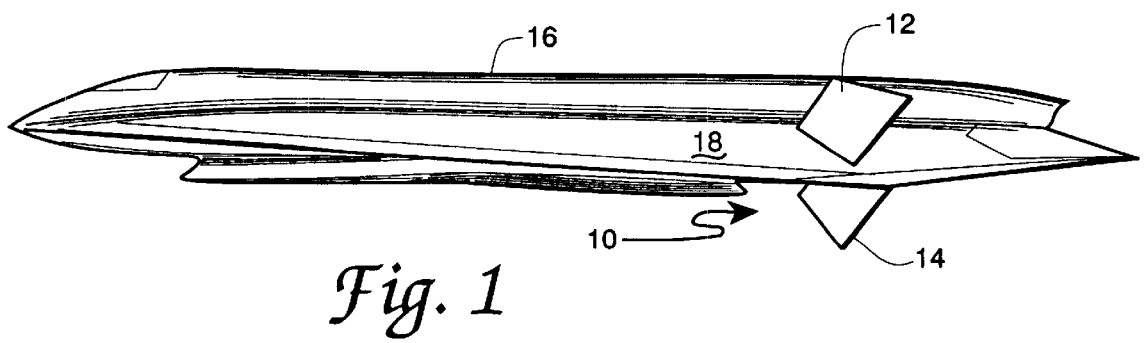
FIG. 1 is a perspective view of the wing mounted yaw control device of the present invention mounted upon a tailless aircraft.

Reference is made to FIG. 1 showing the wing mounted yaw control device 10 of the present invention. As shown, the yaw control device 10 includes a deployable spoiler 12 and a deployable deflector 14. The spoiler 12 and deflector 14 are hingedly mounted on the upper and lower surfaces of a wing 18 of an aircraft 16, respectively. The deflector 14 is deployed in an opposite manner to the spoiler 12. As shown, the spoiler 12 directs the flow of air away from the wing 18, whereas the deflector 14 directs the flow of air into the wing 18.

For the sake of clarity, the yaw control device 10 will be shown and described with respect to a single wing 18, but it should be appreciated that the yaw control device 10 is identically mounted on both wings 18 of the aircraft 16 in order to effect aircraft control during flight.

The spoiler 12 and deflector 14 can be made out of any material currently in use for aircraft control devices, such as aluminum or carbon graphite. The size of the spoiler 12 and deflector 14 would depend on the size of the aircraft wing 18 and the required yaw moment they are required to produce. For example, and simply for the purposes of illustration, in a wing 18 with a total span of 120 ft and a chord of about 18 ft, the spoiler 12 and deflector 14 would each be about 4 ft long and 4 to 8 ft wide. The total amount of wing area covered by the spoiler 12 and deflector 14 when not deployed would be between 1 and 5 percent. The spoiler 12 and deflector 14 would be flush with the wing surface 18 when they are not deployed.

In the preferred embodiment, the spoiler 12 and deflector 14 are of approximately equal size, and are located at approximately the same spanwise position on the wing 18. The size and shape of the spoiler 12 and deflector 14 can be varied to suit aircraft configuration and performance characteristics.

Figure 2:
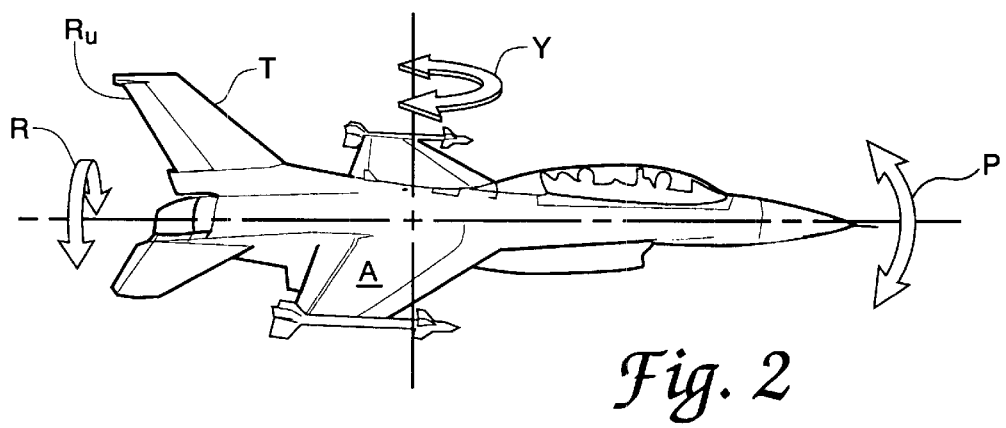
FIG. 2 is a diagrammatic view showing roll, yaw and pitch vectors with respect to an aircraft in flight.

Reference is now made to FIG. 2 showing a conventional aircraft A. The three dimensional movement of the aircraft A can be described in terms of vectors P, R and Y. More specifically, the aircraft A moves in pitch in accordance with the vector P. Similarly, the aircraft A moves in roll and yaw in accordance with the vectors R and Y respectively. As shown, conventional aircraft generally include a vertical tail section T including a rudder $R_u$ for imparting the desired yaw moment (Y vector) to the aircraft. In the case of aircraft having no tail, as shown in FIG. 1, the yaw control device 10 of the present invention is provided to selectively impart a degree of drag to the desired wing 18 in order to move the aircraft in the Y vector direction.

Figure 3:
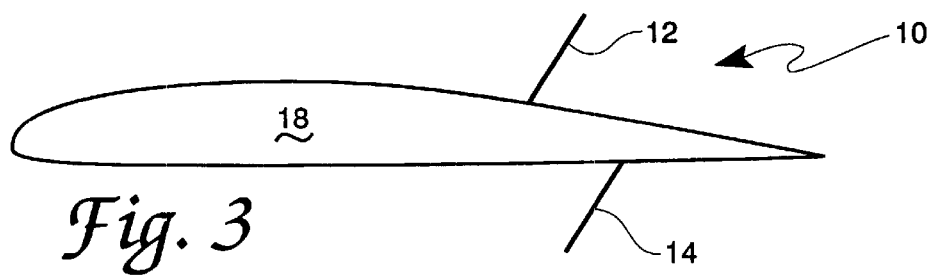
FIG. 3 is an end elevational view of an aircraft wing showing the wing mounted yaw control device in a deployed position.
Figure 6:
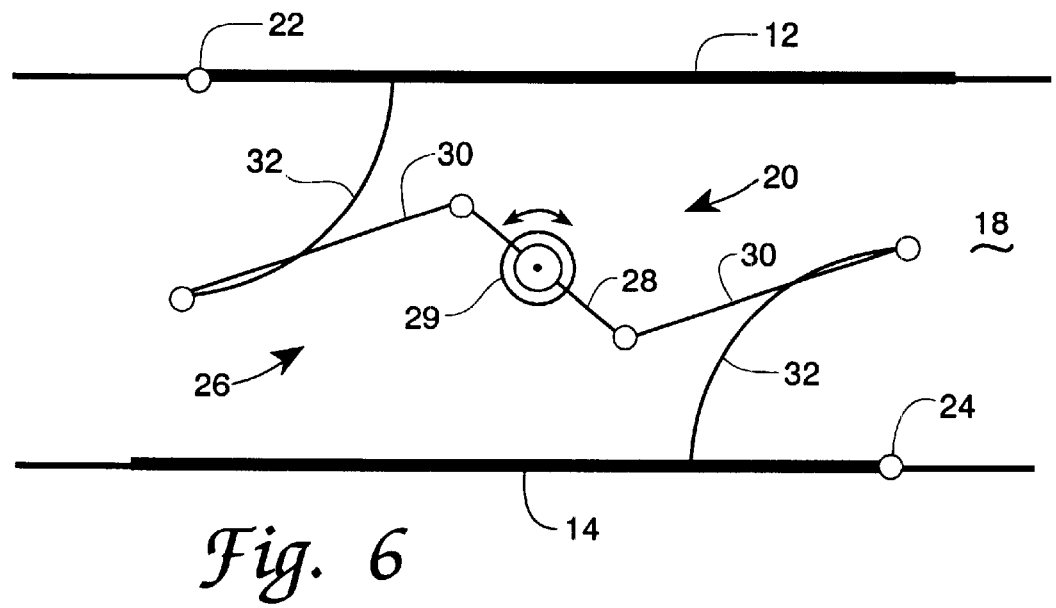
FIG. 6 is a diagrammatic cross sectional view of an aircraft wing showing the wing mounted yaw control device of the present invention in the null, non-deployed position.
Figure 7:
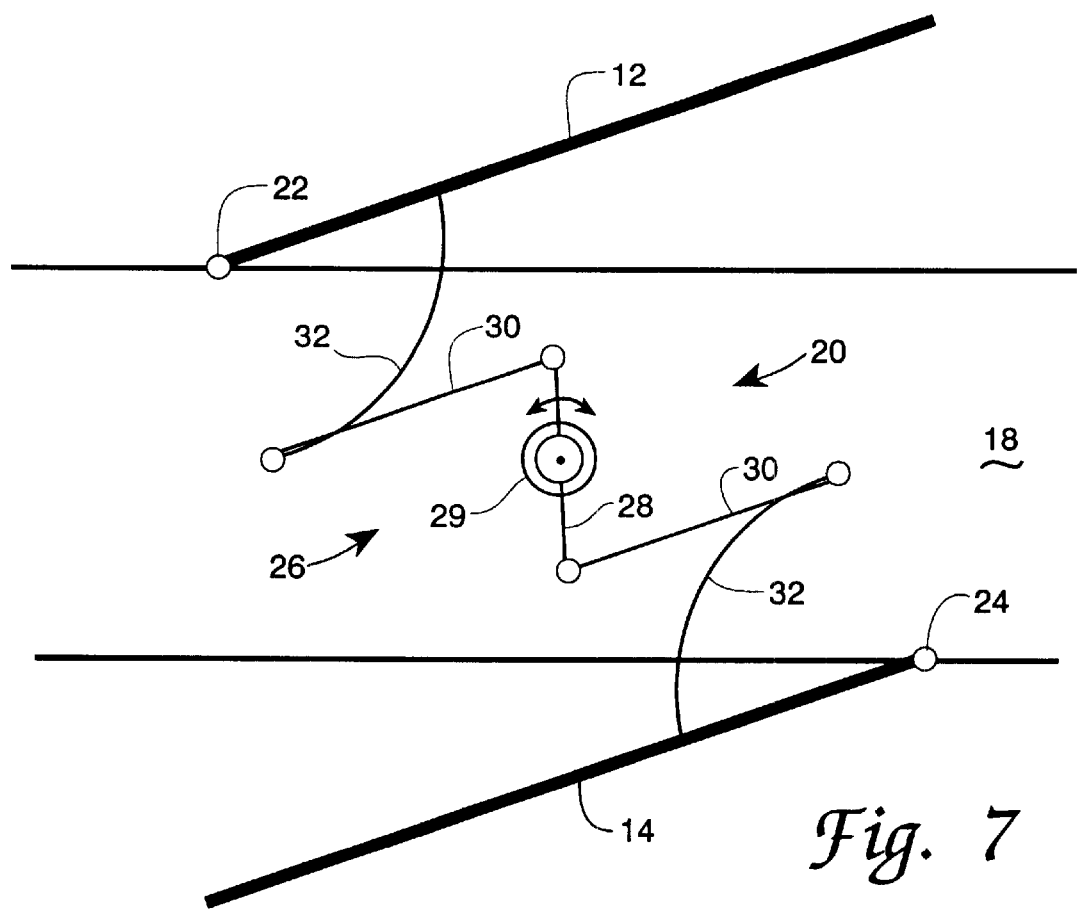
FIG. 7 is a diagrammatic cross sectional view of an aircraft wing showing the wing mounted yaw control device of the present invention in a deployed position; and, FIG. 8 is partial perspective view of the wing mounted yaw control device of the present invention showing the spoiler in a deployed position.

As shown in FIG. 6, the spoiler 12 and deflector 14 are hingedly mounted upon first and second surfaces of the wing 18 via hinges 22 and 24 respectively. During operation, the spoiler 12 and deflector 14 are positionable from the null position shown in FIG. 6 to the fully deployed position as shown in FIGS. 3 and 7. A deployment mechanism 20 is provided to selectively effect the desired deployment of the spoiler 12 and the deflector 14. The deployment mechanism 20 operates to deploy the spoiler 12 and deflector 14-simultaneously. As will be described in more detail below, this assures that the lift forces exerted by the spoiler 12 and deflector 14 are balanced, thereby not inducing an aircraft roll motion. The deployment mechanism 20 would be integrated into an aircraft control system, not shown, to enable selective deployment by the pilot in order to effect the desired course changes.

The deployment mechanism 20 includes a kinematic linkage 26 incorporating a rotatably mounted actuating link 28, a rotary actuator 29 mounted at the center of link 28 for rotary actuation thereof, a pair of connecting links 30 pivotably mounted to the distal ends of the actuating link 28 and a pair of deployment arms 32 pivotably mounted, in turn, to the other ends of the connecting links 30. The deployment arms 32 are fixedly attached to the spoiler 12 and deflector 14 and are provided in order to extend them into and out of the airstream of the aircraft in flight.

Figure 8:
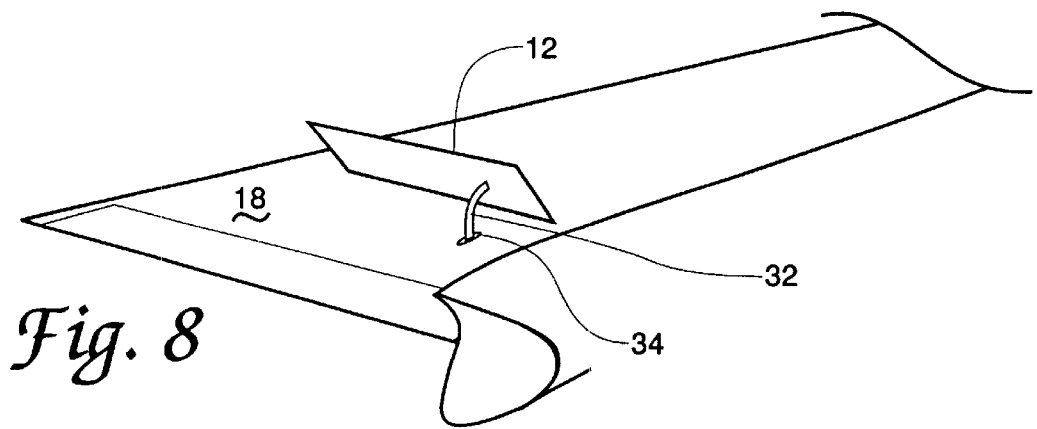

Advantageously, and according to an important aspect of the present invention, the deployment arms are arcuate. As shown in FIG. 8, by virtue of its arcuate shape, each deployment arm 32 requires only a small aperture 34 for extension outside the surface of the wing 18. As can be appreciated, this represents an improvement over the known straight arm actuators which require an elongate slot in the wing surface to enable actuator arm freedom of motion. Accordingly, this enables operation of the yaw control device 10 of the present invention while maintaining a substantially aerodynamically continuous aerosurface of the wing 18, thereby maximizing yaw control effectiveness.

It is another advantage of the present invention that the operative combination of the spoiler 12 and the deflector 14, when deployed in flight, impart very low torsional loading forces upon the rotary actuator 29. This is because the forces imparted upon the spoiler 12 by the wind and force imparted upon the deflector 14 by the wind, when transmitted to the ends of link 28, counter each other, thereby creating a very low net torsional force upon the rotary actuator 29 located at the center of link 28. The overall net effect is a substantial balancing of the forces, resulting in very low actuation force requirements. This has the dual advantage of providing ease of operation while simultaneously reducing the size and energy requirement of the deployment mechanism 20.

Another advantage of the yaw control device 10 of the present invention is that the roll forces (vector R in FIG. 2) exerted upon the aircraft wing 18 by the spoiler 12 and deflector 14 also balance each other out. More specifically, the force of the wind exerted upon the spoiler 12 creates a negative lift force. The force of the wind exerted upon the deflector 14 creates a positive lift force. The overall net effect is cancellation of the two roll forces, enabling aircraft yaw without the addition of undesirable roll.

Figure 5:
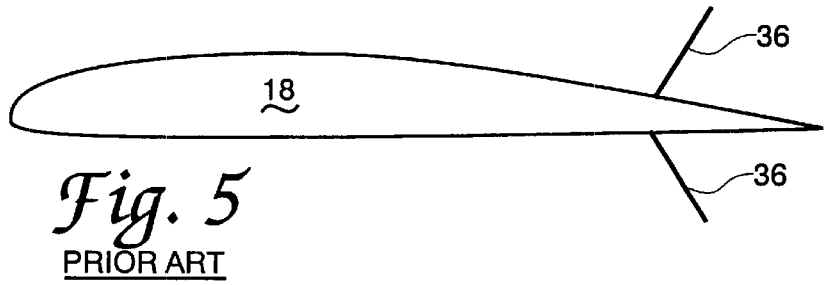
FIG. 5 is an end elevational view of an aircraft wing showing a prior art split aileron yaw control device.

As can be appreciated by reference to FIG. 5, the "clamshell" type split aileron yaw control device of the prior art requires a much greater actuating force to extend and maintain the desired ailerons 36 in position. This is because the actuator must overcome the closing force exerted by the wind upon each aileron 36 in order to provide the desired yaw control. Another limitation inherent in this design is that there exists a "deadband" of actuation wherein the ailerons must be deployed a minimum amount before any yaw motion takes place. This is due, in par to the placement of the ailerons on the trailing edge of the wing. As a result, the ailerons are often maintained in a partially extended position in order to reduce the deadband effect. This has the disadvantage of increasing drag as well as the forces exerted on the aileron extension mechanism. As can be appreciated from the description above, these limitations are avoided in the yaw control device 10 of the present invention.

Figure 4:
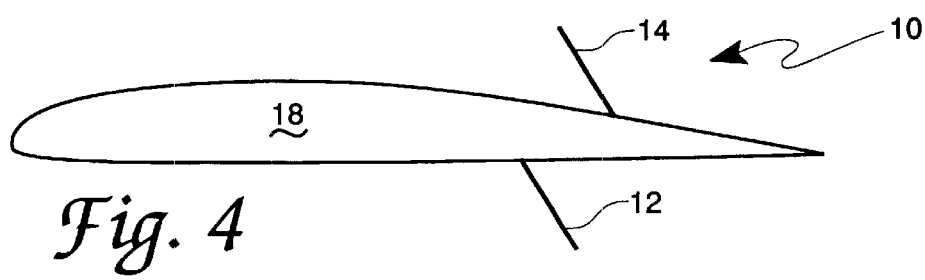
FIG. 4 is an end elevational view of an aircraft wing incorporating an alternative embodiment of the wing mounted yaw control device of the present invention.

In an alternative embodiment, the spoiler 12 and deflector are reversed in orientation upon the surfaces of the wing 18. More specifically and as shown in FIG. 4 the deflector 14 is mounted on the top surface of the wing and the spoiler 12 is mounted upon the bottom of the wing surface 18. The same deployment mechanism 20, similarly reversed, can be utilized for deployment of the yaw control device 10.

In summary, numerous benefits have been described from utilizing the principles of the present invention. The yaw control device 10 of the present invention provides effective yaw moment to an aircraft in flight through selective, simultaneous deployment of the spoiler 12 and deflector 14 into the airstream. This causes a drag force to be exerted on a wing, thereby imparting the desired yaw moment to an aircraft in flight. The yaw control device 10 additionally provides for an effective speed brake for the aircraft 16 by simply deploying the yaw control device 10 on both wings simultaneously.

The foregoing description of the preferred embodiment has been presented for purposes of illustration and description. It is not intended to be exhaustive or to limit the invention to the precise form disclosed. Obvious modifications or variations are possible in light of the above teachings. For example, several yaw control devices 10 could be incorporated within each wing of the aircraft 16, depending on aircraft configuration. Alternatively, a linear actuator could be utilized in place of the rotary actuator 29 in order to effect the desired actuation of the kinematic linkage 26. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. An apparatus for imparting yaw moment to an air vehicle in flight, comprising;

a deployable spoiler mounted upon an upper aerodynamically continuous wing surface, said spoiler being mounted upon said wing surface by a hinge, said hinge preventing the passage of air between said spoiler and said wing surface upon deployment of said spoiler;

a deployable deflector mounted upon a lower aerodynamically continuous wing surface, said deflector being mounted on said lower wing surface for deployment in an opposite manner with respect to said spoiler; said deflector having a size approximately equal to that of said spoiler, said deflector being mounted upon said lower wing surface by a hinge, said hinge preventing the passage of air between said deflector and said lower wing surface upon deployment of said spoiler; and, a deployment mechanism in operative engagement with said spoiler and said deflector for simultaneous deployment thereof, said deployment mechanism being selectively operable to selectively deploy said spoiler and said deflector, said deployment mechanism being a kinematic linkage having a pair of arcuate deployment arms, one of said arcuate deployment arms being attached to said spoiler, and one of said arcuate deployment arms being attached to said deflector, respectively.

2. The apparatus of claim 1 wherein said deployment mechanism includes a rotary actuator for angularly actuating said kinematic linkage to provide deployment actuation.

3. The apparatus of claim 2 wherein said kinematic linkage includes an actuator link attached at its center point to said rotary actuator.

4. The apparatus of claim 3 wherein said kinematic linkage includes a pair of connecting links, each one of said connecting links being pivotably mounted to an actuator link distal end, each one of said connecting links, in turn, being pivotably mounted to each one of said arcuate deployment arms.

* * * * *

UNITED STATES PATENT AND TRADEMARK OFFICE
CERTIFICATE OF CORRECTION

PATENT NO. : 6,491,261 B1  
DATED : December 10, 2002  
INVENTOR(S) : William Blake It is certified that error appears in the above-identified patent and that said Letters Patent is hereby corrected as shown below:

Column 1,
Line 59, "jod" should be deleted

Column 5,
Line 6, "in par" should read -- in part, --.

Signed and Sealed this

Fourth Day of March, 2003

JAMES E. ROGAN
*Director of the United States Patent and Trademark Office*